(12) United States Patent
Kato et al.

(10) Patent No.: US 10,074,851 B2
(45) Date of Patent: Sep. 11, 2018

(54) SURFACE MODIFIED LITHIUM-CONTAINING COMPOSITE OXIDE PARTICLES, POSITIVE ELECTRODE USING THE PARTICLES, AND NON-AQUEOUS ELECTROLYTE SECONDARY BATTERY

(71) Applicant: SUMITOMO CHEMICAL CO., LTD., Tokyo (JP)

(72) Inventors: Tomoo Kato, Tokyo (JP); Remi Hiraki, Tokyo (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 330 days.

(21) Appl. No.: 14/723,759

(22) Filed: May 28, 2015

(65) Prior Publication Data

US 2015/0263341 A1 Sep. 17, 2015

Related U.S. Application Data

(63) Continuation of application No. PCT/JP2013/084971, filed on Dec. 26, 2013.

(30) Foreign Application Priority Data

Dec. 28, 2012 (JP) ................ 2012-287780

(51) Int. Cl.
*H01M 4/00* (2006.01)
*H01M 4/36* (2006.01)
(Continued)

(52) U.S. Cl.
CPC ........ *H01M 4/366* (2013.01); *C01G 45/1214* (2013.01); *C01G 51/42* (2013.01);
(Continued)

(58) Field of Classification Search
CPC ...... H01M 4/366; H01M 4/505; H01M 4/525; H01M 4/62; H01M 4/131; H01M 4/1315;
(Continued)

(56) References Cited

U.S. PATENT DOCUMENTS

2004/0137325 A1* 7/2004 Suhara ............... C01G 51/42
429/231.3
2007/0292764 A1 12/2007 Soma et al.
(Continued)

FOREIGN PATENT DOCUMENTS

JP 2007-005073 * 6/2005 ............. H01M 4/58
JP 2006-156032 6/2006
(Continued)

OTHER PUBLICATIONS

English Translation of JP2007-005073.*
International Search Report dated Feb. 25, 2014 in PCT/JP2013/084971 filed on Dec. 26, 2013.

*Primary Examiner* — Nicholas P D'Aniello
(74) *Attorney, Agent, or Firm* — Oblon, McClelland, Maier & Neustadt, L.L.P.

(57) ABSTRACT

Surface modified lithium-containing composite oxide particles include base material particles of lithium-containing composite oxide, zirconium hydroxide or zirconium oxide, and at least one lithium salt selected from the group consisting of $Li_2ZrF_6$, $Li_2TiF_6$, $Li_3PO_4$, $Li_2SO_4$ and $Li_2SO_4.H_2O$. The zirconium hydroxide or zirconium oxide, and the at least one lithium salt are attached to a surface of the base material particle. The lithium-containing composite oxide is represented by the formula: $Li_pN_xM_yO_zF_a$. N is at least one element selected from the group consisting of Co, Mn and Ni; M is at least one element selected from the group consisting of Al, elements of group 2, and transition metal (Continued)

elements other than N; $0.9 < p < 1.1$; $0.85 < x < 1.0$; $0 < y < 0.15$; $1.9 < z < 2.1$; $x+y=1$; and $0 < a < 0.05$.

15 Claims, 1 Drawing Sheet (51) Int. Cl.
| | |
|---|---|
| H01M 4/505 | (2010.01) |
| H01M 4/525 | (2010.01) |
| H01M 4/62 | (2006.01) |
| C01G 51/00 | (2006.01) |
| C01G 53/00 | (2006.01) |
| C01G 45/12 | (2006.01) |
| H01M 10/052 | (2010.01) |
| H01M 4/131 | (2010.01) |
| H01M 4/1315 | (2010.01) |
| H01M 4/02 | (2006.01) |

(52) U.S. Cl.
CPC ............ *C01G 53/42* (2013.01); *C01G 53/50* (2013.01); *H01M 4/505* (2013.01); *H01M 4/525* (2013.01); *H01M 4/62* (2013.01); *C01P 2002/72* (2013.01); *C01P 2002/85* (2013.01); *C01P 2004/51* (2013.01); *C01P 2004/61* (2013.01); *C01P 2004/80* (2013.01); *C01P 2004/84* (2013.01); *C01P 2006/10* (2013.01); *H01M 4/131* (2013.01); *H01M 4/1315* (2013.01); *H01M 10/052* (2013.01); *H01M 2004/028* (2013.01)

(58) Field of Classification Search
CPC .......... H01M 2004/028; H01M 10/052; C01G 53/50; C01G 45/1214; C01G 53/42; C01G 51/42; C01P 2002/72; C01P 2004/80; C01P 2004/84; C01P 2004/61; C01P 2004/51; C01P 2002/85; C01P 2006/10

See application file for complete search history.

(56) References Cited

U.S. PATENT DOCUMENTS

| | | | |
|---|---|---|---|
| 2008/0248400 | A1 | 10/2008 | Hwang et al. |
| 2010/0028768 | A1* | 2/2010 | Morita ................ H01M 2/1653 429/144 |
| 2012/0225350 | A1 | 9/2012 | Soma et al. |

FOREIGN PATENT DOCUMENTS

| | | |
|---|---|---|
| JP | 2006-196433 | 7/2006 |
| JP | 2007-005073 | 1/2007 |
| JP | 2007-5267 | 1/2007 |
| JP | 2007-335331 | 12/2007 |
| JP | 2008-506244 | 2/2008 |
| JP | 2008-258133 | 10/2008 |
| JP | 2009-54583 | 3/2009 |
| JP | 2011-216300 | 10/2011 |
| WO | WO 2006/123572 | 11/2006 |
| WO | WO 2012/176903 | 12/2012 |

* cited by examiner

SURFACE MODIFIED LITHIUM-CONTAINING COMPOSITE OXIDE PARTICLES, POSITIVE ELECTRODE USING THE PARTICLES, AND NON-AQUEOUS ELECTROLYTE SECONDARY BATTERY

TECHNICAL FIELD

The present invention relates to surface modified lithium-containing composite oxide particles to be used as a positive electrode material of a non-aqueous electrolyte secondary battery such as a lithium ion secondary battery, a positive electrode using the particles, and a non-aqueous electrolyte secondary battery.

BACKGROUND ART

Recently, as the portability and cordless tendency of instruments have progressed, a demand for a non-aqueous electrolyte secondary battery such as a lithium ion secondary battery which is small in size and light in weight and has a high energy density, has been increasingly high. As a positive electrode material for the non-aqueous electrolyte secondary battery, a composite oxide of lithium and a transition metal or the like (such a composite oxide may sometimes be referred to as a "lithium-containing composite oxide" in the present invention) such as $LiCoO_2$, $LiNi_{1/3}Co_{1/3}Mn_{1/3}O_2$, $LiNiO_2$, $LiNi_{0.8}Co_{0.2}O_2$ or $LiMn_2O_4$, has been known.

Particularly, a lithium ion secondary battery using $LiCoO_2$ as a cathode active material and using as a negative electrode a lithium alloy, carbon such as graphite or carbon fiber, a silicon alloy comprising a composite containing graphite and silicon, or a tin alloy comprising a composite containing tin and carbon, can obtain a high voltage at a level of 4 V, whereby it has been widely used as a battery having a high energy density.

However, in a case where $LiCoO_2$ is used as the positive electrode material, further improvement has been desired e.g. in the discharge capacity, in the average discharge voltage, in the stability against heat during heating (sometimes referred to simply as a safety in the present invention) and in the capacity density per unit volume of the positive electrode layer (sometimes referred to simply as a volume capacity density in the present invention), and it had a problem of e.g. deterioration in the durability for charge and discharge cycles such as a decrease in the discharge capacity of the battery or swelling by a reaction of the interface of the lithium-containing composite oxide with the electrolytic solution, by carrying out charge and discharge cycles repeatedly.

Further, in high voltage application at a discharge voltage of from 4.4 to 4.6 V using as a negative electrode lithium metal, an alloy, carbon or the like, there are problems such as significant deterioration of the charge and discharge cycle durability and swelling of a battery due to generation of a gas such as carbon dioxide by decomposition of the electrolytic solution. Further, along with spread of multifunctional mobile terminals in recent years, a demand for a higher capacity battery has been increasingly high, and it has been desired to develop a cathode material for high voltage which has a high density, which achieves a higher charge and discharge capacity by high voltage discharge, and which has more excellent charge and discharge cycle durability which is an object to be accomplished at the time of use under high voltage than ever before. Further, for a polymer lithium ion secondary battery effective to reduction in thickness of multifunctional portable terminals, swelling-suppressing performance when charged under high voltage and stored at high temperature is more emphasized. The above high voltage more specifically means conditions where a discharge voltage is applied under 4.4 to 4.6 V vs. $Li^+/Li$.

To achieve such an object, for example, use of a surface modified lithium-containing composite oxide comprising a lithium-containing composite oxide having a composition of $LiNi_{0.81}Co_{0.15}Al_{0.04}O_2$ or $LiCoO_2$ covered with zirconium metal, $ZrO_2$ or the like by a sputtering method has been proposed (Patent Documents 1 and 2).

Further, use of a surface modified lithium-containing composite oxide comprising a lithium-containing composite oxide such as $Li_{1.03}Co_{0.98}Al_{0.01}Mg_{0.01}O_2$ or $LiCoO_2$ covered with aluminum phosphate obtained by mixing the lithium-containing composite oxide with an aluminum compound and a phosphorus compound and subjecting the mixture to heat treatment, has been proposed (Patent Documents 3 and 4).

Further, use of a surface modified lithium-containing composite oxide comprising a core of a lithium-containing composite oxide such as $LiCoO_2$ and a surface-treated layer formed on the core which contains P as a first element and Mg, Al or the like as a second element has been proposed (Patent Document 5). Further, use of a surface modified lithium-containing composite oxide comprising a lithium-containing composite oxide such as $LiCo_{0.98}Al_{0.01}Mg_{0.01}O_2$ and a covering layer which contains phosphorus and manganese, or phosphorus and magnesium, has been proposed (Patent Document 6).

PRIOR ART DOCUMENTS

Patent Documents

Patent Document 1: JP-A-2006-196433
Patent Document 2: JP-A-2007-005073
Patent Document 3: WO2006/123572
Patent Document 4: JP-A-2008-506244
Patent Document 5: JP-A-2008-258133
Patent Document 6: JP-A-2009-54583

DISCLOSURE OF INVENTION

Technical Problem

As mentioned above, various studies have been made, however, a cathode active material for a non-aqueous electrolyte secondary battery, which has a sufficient discharge capacity and has excellent charge and discharge cycle durability at the time of use under high voltage, and which brings about high swelling-suppressing performance of a battery, whereby decomposition of an electrolytic solution is sufficiently suppressed when discharged under high voltage and stored at high temperature of at least 40° C., has not yet been found.

For example, with the surface modified lithium-containing composite oxide covered with zirconium metal or $ZrO_2$ as disclosed in Patent Document 1 or 2, the swelling-suppressing performance is insufficient.

With the surface modified lithium-containing composite oxide having the surface of particles covered with aluminum phosphate as disclosed in Patent Document 3 or 4, a decrease in the discharge capacity and/or deterioration of the charge and discharge cycle durability occurs.

With the surface lithium-containing composite oxide comprising a core of a lithium-containing composite oxide and a surface-treated layer which contains P and Mg or P and Al as disclosed in Patent Document 5, deterioration of the charge and discharge cycle durability occurs. Further, with the surface modified lithium-containing composite oxide comprising a lithium-containing composite oxide having a covering layer which contains phosphorus and manganese or phosphorus and magnesium as disclosed in Patent Document 6, deterioration of the charge and discharge cycle durability occurs.

Under these circumstances, the object of the present invention is to provide a cathode active material for a non-aqueous electrolyte secondary battery, which is excellent in the battery performance such as the charge and discharge cycle durability when used under high voltage, and which is excellent in the swelling-suppressing performance when stored at high temperature in a state where it is charged under high voltage.

Solution to Problem

The present inventors have conducted extensive studies to accomplish the above object and as a result, accomplished the present invention which provides the following.
(1) Surface modified lithium-containing composite oxide particles represented by the formula: $Li_pN_xM_yO_zF_a$ (wherein N is at least one element selected from the group consisting of Co, Mn and Ni, M is at least one element selected from the group consisting of Al, elements of group 2, and transition metal elements other than N, $0.9 \leq p \leq 1.1$, $0.85 \leq x \leq 1.0$, $0 \leq y \leq 0.15$, $1.9 \leq z \leq 2.1$, $x+y=1$, and $0 \leq a \leq 0.05$), characterized in that zirconium hydroxide or zirconium oxide and at least one lithium salt selected from the group consisting of $Li_2ZrF_6$, $Li_2TiF_6$, $Li_3PO_4$, $Li_2SO_4$ and $Li_2SO_4 \cdot H_2O$ are attached to the particle surface.
(2) The surface modified lithium-containing composite oxide particles according to the above (1), wherein the value calculated by dividing the number of moles $N_{Zr}$ of zirconium hydroxide and zirconium oxide attached to the particle surface by the total number of moles $N_{m+n}$ of M and N contained in the lithium-containing composite oxide particles, i.e. $N_{Zr}/N_{m+n}$ is $0.0001 \leq N_{Zr}/N_{m+n} \leq 0.01$.
(3) The surface modified lithium-containing composite oxide particles according to the above (1) or (2), wherein the value calculated by dividing the number of moles $N_a$ of the lithium salt attached to the particle surface by the total number of moles $N_{m+n}$ of M and N contained in the lithium-containing composite oxide particles, i.e. $N_a/N_{m+n}$ is $0.0001 \leq N_a/N_{m+n} \leq 0.01$.
(4) The surface modified lithium-containing composite oxide particles according to the above (3), wherein the value calculated by dividing $N_{Zr}$ by $N_a$ i.e. $N_{Zr}/N_a$ is $0.05 \leq N_{Zr}/N_a \leq 2.0$.
(5) The surface modified lithium-containing composite oxide particles according to any one of the above (1) to (4), wherein the lithium salt is $Li_2ZrF_6$ or $Li_3PO_4$.
(6) The surface modified lithium-containing composite oxide particles according to any one of the above (1) to (5), wherein zirconium oxide is attached to the particle surface.
(7) The surface modified lithium-containing composite oxide particles according to any one of the above (1) to (6), wherein N is Co.
(8) The surface modified lithium-containing composite oxide particles according to any one of the above (1) to (7), wherein M is at least one element selected from the group consisting of Al, Zr and Mg.
(9) The surface modified lithium-containing composite oxide particles according to any one of the above (1) to (8), wherein in a powder X-ray diffraction spectrum using CuKα radiation, the integral width of a diffraction peak of (110) plane at $2\theta=66.5\pm1°$ is from 0.08 to 0.20°.
(10) The surface modified lithium-containing composite oxide particles according to any one of the above (1) to (9), wherein the mode diameter of the particle size distribution is from 15 to 25 μm, and the shoulder peak is from 4 to 10 μm.
(11) A positive electrode for a non-aqueous electrolyte secondary battery, which comprises a cathode active material, a conductive material and a binder, wherein the cathode active material comprises the surface modified lithium-containing composite oxide particles as defined in any one of the above (1) to (10).
(12) A non-aqueous electrolyte secondary battery, which comprises a positive electrode, a negative electrode, a non-aqueous electrolyte and an electrolytic solution, wherein the positive electrode is the positive electrode as defined in the above (11).

Advantageous Effects of Invention

According to the present invention, surface modified lithium-containing composite oxide particles to be used for e.g. a lithium ion secondary battery which is excellent in the battery performance such as the charge and discharge cycle durability under high voltage, and is excellent particularly in the swelling-suppressing performance when used and stored at high temperature after charged under high voltage.

The mechanism how the surface modified lithium-containing composite oxide particles of the present invention have excellent properties as a positive electrode for a non-aqueous electrolyte secondary battery as mentioned above is not necessarily clear but is estimated as follows.

When only zirconium hydroxide or zirconium oxide is attached to the particle surface of a lithium-containing composite oxide, swelling of a battery will occur. Further, when only a specific lithium salt is attached to the particle surface, the charge and discharge cycle durability tends to deteriorate. Whereas when zirconium hydroxide or zirconium oxyhydroxide and the above-defined specific lithium salt are simultaneously attached to the particle surface of a lithium-containing composite oxide, surface modified lithium-containing composite oxide particles which have an effect to suppress swelling of a battery, of which a decrease in the density does not occur, and which have excellent charge and discharge cycle durability can be obtained.

The surface modified lithium-containing composite oxide particles of the present invention are obtained by mixing a lithium-containing composite oxide, a zirconium source and an ammonium salt to be a lithium salt, to attach the zirconium source and the ammonium salt to the particle surface of the lithium-containing composite oxide, followed by heat treatment. It is considered that at the time of the heat treatment, the ammonium salt on the particle surface reacts with lithium atoms present in excess on the particle surface to form the above-defined lithium salt. As a result, it is estimated that the effect to improve the charge and discharge cycle durability by attaching zirconium hydroxide or zirconium oxide to the particle surface is maintained and in addition, the effect to suppress swelling of a battery by attaching a lithium salt to the particle surface is obtained simultaneously. Further, by the reaction for formation of a lithium salt from an ammonium salt at the time of heat treatment, zirconium hydroxide or zirconium oxide and the lithium salt are more uniformly attached, not in the island-form, to the particle surface of the lithium-containing composite oxide, whereby surface modified lithium-containing composite oxide particles of which the density is not decreased and which have excellent charge and discharge cycle durability can be obtained.

DESCRIPTION OF EMBODIMENTS

The surface modified lithium-containing composite oxide particles of the present invention comprise a lithium-containing composite oxide having a composition represented by the formula $Li_pN_xM_yO_zF_a$ as a base material and on the particle surface of the composite oxide, zirconium hydroxide or zirconium oxide and at least one lithium salt selected from the group consisting of $Li_2ZrF_6$, $Li_2TiF_6$, $Li_3PO_4$ (lithium phosphate), $Li_2SO_4$ (lithium sulfate) and $Li_2SO_4 \cdot H_2O$ (lithium sulfate monohydrate).

Zirconium hydroxide or zirconium oxide attached to the particle surface is preferably zirconium oxide, particularly preferably $ZrO_2$. Further, both zirconium hydroxide and zirconium oxide may be attached to the particle surface. The value calculated by dividing the number of moles $N_{Zr}$ of zirconium hydroxide and zirconium oxide attached to the particle surface by the total number of moles $N_{m+n}$ of M and N contained in the lithium-containing composite oxide particles, i.e. "$N_{Zr}/N_{m+n}$" is preferably such that $0.0001 \leq N_{Zr}/N_{m+n} \leq 0.01$, more preferably $0.0002 \leq N_{Zr}/N_{m+n} \leq 0.006$, particularly preferably $0.0004 \leq N_{Zr}/N_{m+n} \leq 0.003$.

The lithium salt attached to the particle surface is as mentioned above and is preferably at least one lithium salt selected from the group consisting of $Li_2ZrF_6$, $Li_2TiF_6$ and $Li_3PO_4$, more preferably $Li_2ZrF_6$ or $Li_3PO_4$, particularly preferably $Li_2ZrF_6$.

Further, the value calculated by dividing the number of moles $N_a$ of the lithium salt attached to the particle surface by the total number of moles $N_{m+n}$ of M and N contained in the lithium-containing composite oxide particles as a base material, i.e. "$N_a/N_{m+n}$" is preferably such that $0.0001 \leq N_a/N_{m+n} \leq 0.02$, more preferably $0.0005 \leq N_a/N_{m+n} \leq 0.01$, particularly preferably $0.001 \leq N_a/N_{m+n} \leq 0.005$.

The above $N_{Zr}$ and $N_a$ are calculated from the ingredient amount in principle, but may be measured by any one of ICP spectrometry (inductively-coupled plasma spectrometry), ICP-MS (inductively-coupled plasma mass spectrometry) and XRF analysis (X-ray fluorescence analysis).

The value calculated by dividing $N_{Zr}$ by $N_a$ i.e. $N_{Zr}/N_a$ is preferably such that $0.05 \leq N_{Zr}/N_a \leq 2.0$, more preferably $0.1 \leq N_{Zr}/N_a \leq 1.0$, particularly preferably $0.2 \leq N_{Zr}/N_a \leq 0.5$.

The lithium-containing composite oxide in the present invention is represented by the formula $Li_pN_xM_yO_zF_a$ as mentioned above, and p, x, y, z and a are as defined above. Further, p is preferably $0.95 \leq p \leq 1.10$, more preferably $0.97 \leq p \leq 1.07$, particularly preferably $1.00 \leq p \leq 1.04$. x is preferably $0.90 \leq x \leq 1.0$, more preferably $0.93 \leq x \leq 0.9995$, particularly preferably $0.95 \leq x \leq 0.999$. y is preferably $0 < y \leq 0.10$, more preferably $0.0005 \leq y \leq 0.07$, particularly preferably $0.001 \leq y \leq 0.05$. In such a case, the balance of the battery performance i.e. the balance of the discharge capacity, the safety and the stability for charge and discharge cycles, is good. Further, the discharge capacity tends to decrease when the element M is contained, and accordingly in a case where the discharge capacity is important, preferred is a composition containing no element M, that is, it is preferred that x=1 and y=0. z is preferably $1.95 \leq z \leq 2.05$, more preferably $1.97 \leq z \leq 2.03$.

When the lithium-containing composite oxide contains fluorine, the heat generation starting temperature increases, whereby the safety tends to further improve. Thus, in a case where the safety is important, a is preferably $0 \leq a \leq 0.03$, more preferably $0.0005 \leq a \leq 0.02$, particularly preferably $0.001 \leq a \leq 0.01$. On the other hand, when a=0, that is, when the lithium-containing composite oxide does not contain fluorine, the discharge capacity tends to be high. Accordingly, when the capacity is important, it is preferred that a=0.

N is at least one element selected from the group consisting of cobalt (Co), manganese (Mn) and nickel (Ni), and from the practical viewpoint, preferably cobalt, a combination of nickel and cobalt, or a combination of cobalt, manganese and nickel, more preferably cobalt or a combination of cobalt, manganese and nickel, and further when the energy density per volume is important, particularly preferably cobalt. Further, when N is the combination of cobalt, manganese and nickel, the molar ratio of cobalt, manganese and nickel is preferably 1:1:1, 5:2:3 or 6:2:2. As a more specific combination, preferred is at least one member selected from the group consisting of $Li_{1.02}(Co_{0.33}Mn_{0.33}Ni_{0.34})_{0.98}O_2$, $Li_{1.03}(Co_{0.2}Mn_{0.2}Ni_{0.6})_{0.97}O_2$ and $Li_{1.04}(Co_{0.2}Mn_{0.3}Ni_{0.5})_{0.96}O_2$.

M is at least one element selected from the group consisting of Al, elements of group 2, and transition metal elements other than N, particularly preferably at least one element selected from the group consisting of Al, elements of group 2, and transition metal elements other than Co, Mn and Ni. In the present invention, transition metal elements mean transition metals of group 4, group 5, group 6, group 7, group 8, group 9, group 10, group 11 and group 12 in the periodic table. Among them, M is preferably at least one element selected from the group consisting of Al, Ti, Zr, Hf, Nb, Ta, Mg, Sn and Zn. Particularly, in view of the discharge capacity, the safety, the charge and discharge cycle durability, etc., the element M is more preferably at least one element selected from the group consisting of Al, Ti, Zr, Nb and Mg, particularly preferably at least one element selected from the group consisting of Al, Zr and Mg. Further, it is particularly preferred that the element N is Co, and the element M is three of Al, Zr and Mg.

In the present invention, the composition of the lithium-containing composite oxide may be analyzed by ICP spectrometry (inductively-coupled plasma spectrometry). In the present invention, as a spectrometer, ICPS-8000 manufactured by SHIMADZU CORPORATION may be used.

In the surface modified lithium-containing composite oxide particles of the present invention, the integral width of a diffraction peak of (110) plane at $2\theta=66.5\pm1°$ as measured by X-ray diffraction using CuKα radiation is as mentioned above and further, preferably from 0.08 to 0.18°, more preferably from 0.08 to 0.14°, particularly preferably from 0.09 to 0.13°. Particularly in a lithium-containing composite oxide represented by the formula $Li_pN_xM_yO_zF_a$ wherein N is Co, the integral width of a diffraction peak of (110) plane at $2\theta=66.5\pm1°$ is preferably from 0.09 to 0.13°, more preferably from 0.10 to 0.12, particularly preferably from 0.10 to 0.115.

In the present invention, as the measurement conditions of the powder X-ray diffraction, the accelerating voltage is at least 40 kV and the current is at least 40 mA. As an X-ray diffraction apparatus, RINT2200V manufactured by Rigaku Corporation may be used.

Zirconium hydroxide, zirconium oxide and the above-defined lithium salt attached to the particle surface of the lithium-containing composite oxide in the surface modified lithium-containing composite oxide particles of the present invention may be specified by structural analysis by high resolution powder X-ray diffraction (sometimes referred to as XRD in the present invention) and by elemental analysis of the cross section of particles by electron probe microanalyzer (sometimes referred to as EPMA in the present invention).

The average particle size D50 of the surface modified lithium-containing composite oxide particles of the present invention is preferably from 5 to 30 μm, more preferably from 8 to 25 μm, particularly preferably from 10 to 20 μm.

In the present invention, the average particle size D50 means a volume-based accumulative 50% size (D50) which is a particle size at a point of 50% on an accumulative curve when the accumulative curve is drawn so that a particle size distribution is obtained on the volume basis and the whole volume is 100%. The particle size distribution is obtained from a frequency distribution and accumulative volume distribution curve measured by means of a laser scattering particle size distribution measuring apparatus. The measurement of particle sizes is carried out by measuring the particle size distribution while the powder is sufficiently dispersed in an aqueous medium by an ultrasonic treatment or the like (for example, using Microtrac HRAX-100 manufactured by NIKKISO CO., LTD.). Furthermore, in the present invention, the average particle size D50 may sometimes be referred to simply as the average particle size or D50. Furthermore, D10 means a volume-based accumulative 10% size, and D90 means a volume-based accumulative 90% size.

Further, with respect to the surface modified lithium-containing composite oxide obtained in the present invention, the average particle size D50 means a volume-averaged particle size of secondary particles which are formed by mutual agglomeration and sintering of primary particles, and in a case where the particles are composed of the primary particles only, it means a volume-averaged particle size of the primary particles.

The particle size distribution of the surface modified lithium-containing composite oxide of the present invention is not particularly limited but is preferably bimodal distribution. In the bimodal distribution, the mode diameter which is the particle size with the highest frequency is preferably from 15 to 25 μm, more preferably from 17 to 23 μm. Further, in the present invention, the shoulder peak means a particle size with the minimum gradient (differential value) when the gradient (derivative) of the frequency from the mode diameter towards the direction of smaller particle size is computed in the bimodal volume-based particle size distribution, and the shoulder peak is preferably from 4 to 10 μm, more preferably from 5 to 8 μm. The mode diameter and the shoulder peak may be measured, in the same manner as the case of the average particle size, a laser scattering particle size distribution measuring apparatus such as Microtrac HRAX-100 manufactured by NIKKISO CO., LTD.

The press density of the surface modified lithium-containing composite oxide obtained by the present invention is, when N=Co in the formula described in claim 1, preferably at least 3.4 g/cm$^3$, more preferably at least 3.5 g/cm$^3$, particularly preferably at least 3.6 g/cm$^3$.

In the present invention, the press density means an apparent density of the powder when the powder of the surface modified lithium-containing composite oxide or the lithium-containing composite oxide is pressed under a pressure of 187 MPa (1.91 ton f/cm$^2$).

The process for producing the surface modified lithium-containing composite oxide particles of the present invention is not particularly limited and may, for example, be a process of mixing a powder of a lithium-containing composite oxide, a solution containing zirconium and a solution containing an ammonium salt, and subjecting the mixture to heat treatment.

The zirconium source in the solution containing zirconium is not particularly limited, and is preferably zirconium ammonium carbonate. The zirconium ammonium carbonate is represented as $(NH_4)_2[Zr(CO_3)_2(OH)_2]$. The ammonium source in the solution containing an ammonium salt is preferably at least one member selected from the group consisting of ammonium dihydrogen phosphate, diammonium hydrogen phosphate, ammonium phosphate, ammonium hexafluorozirconate, ammonium sulfate, ammonium hydrogen sulfate and ammonium hexafluorotitanate, more preferably at least one member selected from the group consisting of ammonium dihydrogen phosphate, diammonium hydrogen phosphate, ammonium phosphate and ammonium hexafluorozirconate, particularly preferably ammonium hexafluorozirconate. Here, ammonium hexafluorozirconate is represented as $(NH_4)_2[ZrF_6]$, and ammonium hexafluorotitanate is represented as $(NH_4)_2[TiF_6]$. It is considered that the above ammonium salt reacts with lithium atoms on the particle surface at the time of heat treatment, whereby ammonium ions and lithium ions are replaced with each other to form a lithium salt.

The heat treatment temperature after the coating treatment is not particularly limited, and is preferably from 200 to 800° C., more preferably from 400 to 700° C., particularly preferably from 500 to 600° C. Further, the heat treatment time is not particularly limited, and is preferably from 1 to 48 hours, more preferably from 1 to 24 hours, particularly preferably from 1 to 12 hours. The heat treatment atmosphere is not particularly limited, and is preferably the air.

To produce a positive electrode for a non-aqueous electrolyte secondary battery using as a positive electrode material the surface modified lithium-containing composite oxide particles obtainable by the present invention, first, a powder of the surface modified lithium-containing composite oxide is mixed with a carbon-type conductive material such as acetylene black, graphite or Ketjen black and a binder. As the binder, it is preferred to use polyvinylidene fluoride, polytetrafluoroethylene, polyamide, carboxymethyl cellulose, an acrylic resin or the like. The powder of the surface modified lithium-containing composite oxide obtainable by the present invention, the conductive material and the binder are formed into a slurry or kneaded product by using a solvent or dispersing medium. Such a slurry or kneaded product is applied to a positive electrode current collector such as an aluminum foil by e.g. coating, to form a positive electrode for a non-aqueous electrolyte secondary battery.

As a separator in a non-aqueous electrolyte secondary battery using as a positive electrode material the surface modified lithium-containing composite oxide particles obtainable by the present invention, a film of a porous polyethylene, a porous polypropylene or the like may be used. Further, as a solvent for an electrolytic solution of a battery, various solvents may be used, but among them, a carbonate ester is preferred. The carbonate ester may be cyclic or chained. A cyclic carbonate ester may, for example, be propylene carbonate or ethylene carbonate (EC). A chained carbonate ester may, for example, be dimethyl carbonate, diethyl carbonate (DEC), ethyl methyl carbonate (EMC), methyl propyl carbonate or methyl isopropyl carbonate.

In the present invention, one of the above carbonate esters may be used alone, or two or more of them may be used in combination. Or, they may be used as mixed with another solvent. Further, depending upon the material of the anode active material, it may be possible to improve the discharge characteristics, the cycle durability or the charge and discharge efficiency by using a chained carbonate ester and a cyclic carbonate ester in combination.

Further, in the non-aqueous electrolyte secondary battery using as a positive electrode material the surface modified lithium-containing composite oxide particles obtainable by the present invention, a gel polymer electrolyte containing a vinylidene fluoride-hexafluoropropylene copolymer (for example, manufactured by ELF Atochem, tradename: KYNAR) or a vinylidene fluoride-perfluoropropyl vinyl ether copolymer may be used as the electrolyte. As the solute to be added to the electrolytic solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. The concentration of the lithium salt contained in the electrolytic solvent or the polymer electrolyte is preferably from 0.2 to 2.0 mol/L (liter), particularly preferably from 0.5 to 1.5 mol/L. Within such a concentration range, the ionic conductivity tends to be high, and the electrical conductivity of the electrolyte tends to increase.

In the non-aqueous electrolyte secondary battery using as a cathode material the surface modified lithium-containing composite oxide particles obtainable by the present invention, as the anode active material, a material which can occlude and discharge lithium ions may be used. The material forming the anode active material is not particularly limited, however, lithium metal, a lithium alloy, a carbon material, an oxide comprising, as a main component, a metal of group 14 or group 15 in the periodic table, a carbon compound, a silicon carbide compound, a silicon oxide compound, titanium sulfide, or a boron carbide compound may, for example, be mentioned. As the carbon material, one having an organic material thermally decomposed under various thermal decomposition conditions, artificial graphite, natural graphite, soil graphite, exfoliated graphite or flake graphite may, for example, be used. Further, as the oxide, a compound comprising tin oxide as a main component can be used. As the negative electrode current collector, a copper foil or a nickel foil may, for example, be used. The negative electrode is produced preferably by kneading the anode active material with an organic solvent to form a slurry, which is applied to the metal foil current collector, followed by drying and pressing.

There are no particular restrictions on the shape of the non-aqueous electrolyte secondary battery using as the positive electrode material surface modified lithium-containing composite oxide particles obtainable by the present invention. The shape is selected from a sheet shape, a film shape, a folded shape, a wound cylinder with bottom, a button shape and so on, depending upon the intended purpose.

EXAMPLES

Now, the present invention will be described in further detail with reference to Examples. However, the present invention is by no means restricted to such specific Examples. In the present invention, percentage (%) represents mass % unless otherwise specified.

[Ex. 1] Example of the Present Invention 1.73 g of magnesium carbonate, 20.89 g of aluminum maleate having an Al content of 2.65%, 1.29 g of ammonium zirconium carbonate having a Zr content of 14.5% and 7.76 g of citric acid monohydrate were dissolved in 23.12 g of water to obtain an aqueous solution having a pH of 2.4. This aqueous solution and 197.3 g of cobalt oxyhydroxide having an average particle size of 18 µm, having a cobalt content of 60.0%, were mixed and dried in a constant temperature chamber at 80° C. to obtain a dry powder.

The obtained dry powder and 77.69 g of lithium carbonate having an average particle size of 5.6 µm, having a lithium content of 18.7%, were mixed in a mortar to obtain a raw material mixture. The obtained raw material mixture was calcined in the air at 400° C. for 10 hours and fired in the air at 1,040° C. for 14 hours and then crushed to obtain a powder of large particle size lithium-containing composite oxide having an average particle size of 19.8 µm. The composition of the obtained large particle size lithium-containing composite oxide was $Li_{1.01}(Co_{0.979}Mg_{0.01}Al_{0.01}Zr_{0.001})_{0.99}O_2$.

Then, lithium-containing composite oxide was prepared in the same manner as above except that cobalt oxyhydroxide having an average particle size of 5 µm was used instead of the cobalt oxyhydroxide having an average particle size of 18 µm, to obtain small particle size lithium-containing composite oxide having an average particle size of 6.9 µm. The composition of the obtained small particle size lithium-containing composite oxide was $Li_{1.01}(Co_{0.979}Mg_{0.01}Al_{0.01}Zr_{0.001})_{0.99}O_2$.

The large particle size lithium-containing composite oxide and the small particle size lithium-containing composite oxide were mixed in a mass ratio of 3:1, and to 150 g of the obtained lithium-containing composite oxide with stirring, 5.6 g of an aqueous solution of ammonium zirconium carbonate $(NH_4)_2[Zr(CO_3)_2(OH)_2]$ having a Zr content of 2.5% was sprayed and then 5.9 g of a 15% ammonium dihydrogen phosphate aqueous solution was sprayed at 25° C., followed by mixing, and the mixture was subjected to heat treatment in the air at 600° C. for 12 hours to obtain a surface modified lithium-containing composite oxide powder.

The obtained surface modified lithium-containing composite oxide was embedded in a resin and the cross section of the lithium-containing composite oxide was polished with cerium oxide fine particles, after that zirconium (Zr) and phosphorus (P) present on the particle of the cross section were mapped by EPMA, as a result zirconium element and phosphorus element were detected on the particle surface.

Further, with respect to the obtained surface modified lithium-containing composite oxide, by beam line BL19B2 in a synchrotron radiation facility Super Photon Ring 8 GeV, using a large Debye-Scherrer camera for powder X-ray diffraction measurement, a powder X-ray diffraction spectrum within a range of 2θ of from 3 to 70° was measured. The obtained data were subjected to peak search using JADE+PDF2, and analyzed by Rietveld method using RIETAN-FP. As a result, the surface modified lithium-containing composite oxide was confirmed to contain $ZrO_2$ and $Li_3PO_4$. From results of measurement of EPMA and powder X-ray diffraction, it was confirmed that $ZrO_2$ and $Li_3PO_4$ were attached to the particle surface of the surface modified lithium-containing composite oxide.

Further, as calculated from the amounts of ammonium zirconium carbonate and ammonium dihydrogen phosphate sprayed to the lithium-containing composite oxide, the value calculated by dividing the number of moles $N_{Zr}$ of $ZrO_2$ attached to the particle surface by the total number of moles $N_{m+n}$ of M and N contained in the lithium-containing composite oxide as a base material i.e. $N_{Zr}/N_{m+n}$ was 0.001, and the value calculated by dividing the number of moles $N_a$ of $Li_3PO_4$ attached to the particle surface by the total number of moles $N_{m+n}$ of M and N contained in the lithium-containing composite oxide as a base material i.e. $N_a/N_{m+n}$ was 0.005.

Figure 1:
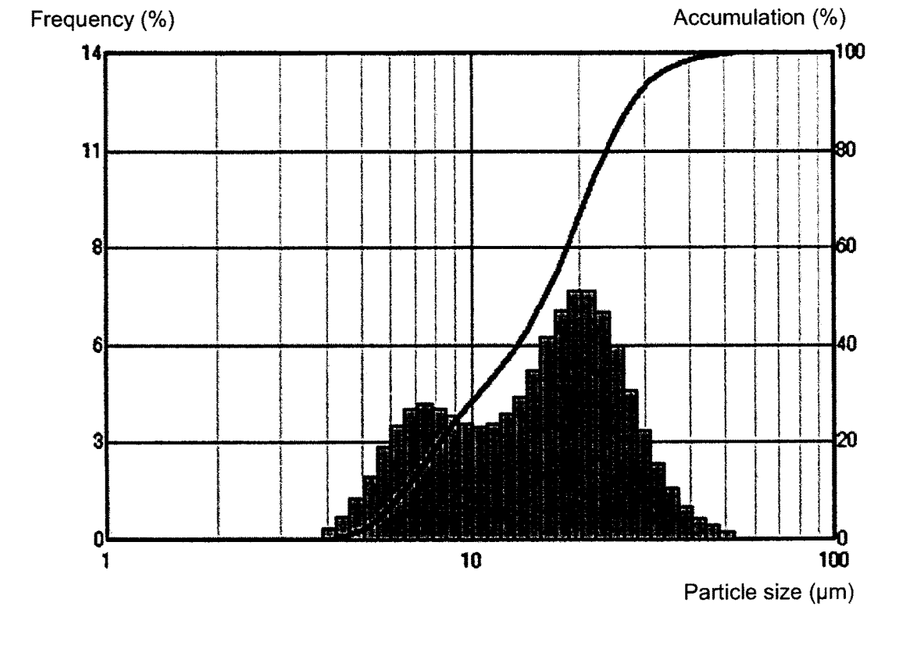
FIG. 1 illustrates particle size distribution of the powder of the surface modified lithium-containing composite oxide obtained in Ex. 1.

The press density of the obtained surface modified lithium-containing composite oxide powder was 3.6 g/cm$^3$. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm. The measured particle size distribution was shown in FIG. 1.

The obtained surface modified lithium-containing composite oxide powder, acetylene black and a polyvinylidene fluoride powder were mixed in a mass ratio of 95/2.5/2.5, and N-methylpyrrolidone was added to form a slurry, which was applied onto one side of an aluminum foil having a thickness of 20 μm, by a doctor blade. After drying, roll pressing was carried out twice to obtain a positive electrode sheet for a lithium battery.

Then, a simplified sealed cell type lithium battery of stainless steel was assembled in an argon glove box, using a punched sheet from the positive electrode sheet as a positive electrode, a metal lithium foil having a thickness of 500 μm as a negative electrode, a nickel foil of 20 μm as a negative electrode current collector, a porous polypropylene having a thickness of 25 μm as a separator and an LiPF$_6$/EC+DEC (1:1) solution (which means a mixed solution of EC and DEC in a volume ratio (1:1) whose solute is LiPF$_6$; the same also applies to solvents as mentioned hereinafter) at a concentration of 1 M as an electrolytic solution.

The obtained battery was charged up to 4.5 V with a load current of 75 mA per 1 g of the cathode active material at 25° C., and then discharged to 2.75 V with a load current of 90 mA per 1 g of the cathode active material to obtain the initial discharge capacity. Further, the battery was sequentially subjected to a charge and discharge cycle test 50 times. As a result, the initial discharge capacity at from 4.5 to 2.75 V was 179 mAh/g, the initial charge and discharge efficiency was 91.1%, and the capacity retention after 50 charge and discharge cycles was 95.8% (hereinafter they will sometimes be referred to as initial discharge capacity, initial charge and discharge efficiency, and capacity retention, respectively).

Then, a positive electrode sheet prepared in the same manner as above was punched, and an aluminum foil current collecting tab was attached to the punched sheet by spot welding to prepare a positive electrode. Further, as an anode active material, graphite having D50 of 20 μm and a specific surface area of 4.4 m$^2$/g and a polyvinylidene fluoride powder as a binder were mixed in a weight ratio of 92:8 and added to N-methyl-2-pyrrolidone as a dispersion medium, followed by kneading to prepare a slurry, which was applied onto one side of a copper foil having a thickness of 20 μm, by a doctor blade. After drying, roll pressing was carried out five times to prepare a negative electrode sheet for a lithium battery, and a nickel foil current-collecting tab was attached to the negative electrode sheet by spot welding to prepare a negative electrode.

The above positive electrode and negative electrode were vacuum dried at 180° C. for 3 hours, and disposed to face each other via a separator in an argon glove box, sandwiched between exterior packaging members comprising a polypropylene aluminum laminate film, outer peripheral portions excluding one side were heat-sealed to form a bag-form so that the electrodes were accommodated in the interior of the external members, and an electrolytic solution was injected into the external packaging members. As the electrolytic solution, a non-aqueous electrolytic solution having 1 wt % of vinylene carbonate (VC) and 1 mol/dm$^3$ of an electrolyte LiPF$_6$ dissolved in a mixture of ethylene carbonate (EC) and diethyl carbonate (DEC) in a volume mixing ratio of 1:1 was used. The opening of the exterior packaging members was heat-sealed by a heat sealer to conduct vacuum sealing and thermo compression bonding, to prepare a plate-form aluminum laminate secondary battery of about 65 mm×75 mm×5.6 mm.

The above prepared laminate cell was charged at constant current under constant voltage under conditions of 0.025 C and a discharge voltage of 4.4 V at room temperature and stored in a constant temperature chamber at 80° C. for 168 hours. The battery after stored was cooled at room temperature for one hour, and then the thickness of the battery was measured to obtain a thickness increase ratio of the cell between before and after storage, whereupon it was 4% (hereinafter the thickness increase ratio between before and after storage of the laminate cell may sometimes be referred to as thickness increase ratio of the laminate cell).

[Ex. 2] Example of the Present Invention

A powder of surface modified lithium-containing composite oxide was obtained in the same manner as in Ex. 1 except that 6.19 g of a 30% ammonium hexafluorozirconate (NH$_4$)$_2$[ZrF$_6$] aqueous solution was sprayed to the lithium-containing composite oxide instead of the 15% ammonium dihydrogen phosphate aqueous solution.

The obtained surface modified lithium-containing composite oxide was embedded in a resin and the cross section of the lithium-containing composite oxide was polished with cerium oxide fine particles, after that zirconium (Zr) and fluorine (F) present on the particle of the cross section were mapped by EPMA, as a result zirconium element and fluorine element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain $ZrO_2$ and $Li_2ZrF_6$. From the results of measurement of EPMA and the powder X-ray diffraction, it was confirmed that $ZrO_2$ and $Li_2ZrF_6$ were attached to the particle surface of the surface modified lithium-containing composite oxide.

Further, as calculated from the amounts of ammonium zirconium carbonate and ammonium hexafluorozirconate sprayed to the lithium-containing composite oxide, the value calculated by dividing the number of moles $N_{Zr}$ of $ZrO_2$ attached to the particle surface by the total number of moles $N_{m+n}$ of M and N contained in the lithium-containing composite oxide as a base material i.e. $N_{Zr}/N_{m+n}$ was 0.001, and the value calculated by dividing the number of moles $N_a$ of $Li_2ZrF_6$ attached to the particle surface by the total number of moles $N_{m+n}$ of M and N contained in the lithium-containing composite oxide as a base material i.e. $N_a/N_{m+n}$ was 0.005.

The press density of the obtained surface modified lithium-containing composite oxide powder was 3.6 g/cm$^3$. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 180 mAh/g, the initial charge and discharge efficiency was 91.6%, and the capacity retention was 96.5%. Further, the thickness increase ratio of the laminate cell was 3%.

[Ex. 3] Example of the Present Invention

To an aqueous solution in which nickel sulfate, cobalt sulfate and manganese sulfate were dissolved so that the atomic ratio of nickel, cobalt and manganese would be Ni:Co:Mn=5:2:3, an ammonium sulfate aqueous solution and a sodium hydroxide aqueous solution were continuously supplied with stirring so that the pH of the aqueous solution would be 11.0 and the temperature would be 50° C., to precipitate a coprecipitate. The reaction was allowed to proceed by adjusting the liquid amount in the reaction system by a concentration method while the reaction liquid was withdrawn, and after a lapse of 48 hours, the reaction was terminated, and the obtained coprecipitate slurry was subjected to filtration, washed with water and dried at 120° C. to obtain a dry powder of a nickel cobalt manganese composite hydroxide. The average particle size D50 of the dry powder was 15 μm.

The obtained composite hydroxide powder was mixed with a powder of lithium carbonate so that the atomic ratio of lithium in lithium carbonate to the total amount of nickel, cobalt and manganese in the composite hydroxide would be 1.03, to obtain a raw material mixture. The obtained raw material mixture was calcined in the air at 550° C. for 4 hours and fired in the air at 950° C. for 15 hours and then crushed to obtain a powder of large particle size lithium-containing composite oxide having an average particle size of 15.3 μm. The composition of the obtained large particle size lithium-containing composite oxide was $Li_{1.02}(Ni_{0.5}Co_{0.2}Mn_{0.3})_{0.98}O_2$.

Then, a lithium-containing composite oxide was prepared and small particle size lithium-containing composite oxide having an average particle size of 6.1 μm was obtained in the same manner as above except that a nickel cobalt manganese composite hydroxide having an average particle size of 5 μm obtained by mixing aqueous solutions so that the pH of the aqueous solution in which nickel sulfate, cobalt sulfate and manganese sulfate were dissolved would be 10 and the temperature would be 35° C., and the reaction time was 15 hours, was used instead of the nickel cobalt manganese composite hydroxide having an average particle size of 15.3 μm. The composition of the obtained small particle size lithium-containing composite oxide was $Li_{1.02}(Ni_{0.5}Co_{0.2}Mn_{0.3})_{0.98}O_2$.

The large particle size lithium-containing composite oxide and the small particle size lithium-containing composite oxide were mixed in a mass ratio of 3:1, and to 150 g of the obtained lithium-containing composite oxide with stirring, 5.6 g of an ammonium zirconium carbonate $(NH_4)_2[Zr(CO_3)_2(OH)_2]$ aqueous solution having a Zr content of 2.5% was sprayed at 25° C. and 5.08 g of a 30% ammonium hexafluorotitanate $(NH_4)_2[TiF_6]$ aqueous solution was sprayed, followed by mixing, and the mixture was subjected to heat treatment in the air at 600° C. for 12 hours to obtain a surface modified lithium-containing composite oxide powder.

The obtained surface modified lithium-containing composite oxide was embedded in a resin and the cross section of the lithium-containing composite oxide was polished with cerium oxide fine particles, after that zirconium (Zr), titanium (Ti) and fluorine (F) present on the particle of the cross section were mapped by EPMA, as a result zirconium element, titanium element and fluorine element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain $ZrO_2$ and $Li_2TiF_6$. From results of measurement of EPMA and powder X-ray diffraction, it was confirmed that $ZrO_2$ and $Li_2TiF_6$ were attached to the particle surface of the surface modified lithium-containing composite oxide.

Further, as calculated from the amounts of ammonium zirconium carbonate and ammonium hexafluorotitanate sprayed to the lithium-containing composite oxide, the value calculated by dividing the number of moles $N_{Zr}$ of $ZrO_2$ attached to the particle surface by the total number of moles $N_{m+n}$ of M and N contained in the lithium-containing composite oxide as a base material i.e. $N_{Zr}/N_{m+n}$ was 0.001, and the value calculated by dividing the number of moles $N_a$ of $Li_2TiF_6$ attached to the particle surface by the total number of moles $N_{m+n}$ of M and N contained in the lithium-containing composite oxide as a base material i.e. $N_a/N_{m+n}$ was 0.005.

The press density of the obtained surface modified lithium-containing composite oxide powder was 3.2 g/cm$^3$. Further, in powder X-ray diffraction using CuKα radiation, the integral width of a diffraction peak of (110) plane at 2θ=66.5±1° was 0.18°. Further, in the particle size distribution of the surface modified lithium-containing composite oxide powder, the mode diameter was 15.3 μm, and the shoulder peak was 6.1 μm.

Then, in the same manner as in Ex. 1, the battery performance of the obtained surface modified lithium-containing composite oxide was evaluated and as a result, the initial discharge capacity was 187 mAh/g, the initial charge and discharge efficiency was 84.5%, and the capacity retention was 95.5%. Further, the thickness increase ratio of the laminate cell was 12%.

[Ex. 4] Example of the Present Invention

A powder of surface modified lithium-containing composite oxide was obtained in the same manner as in Ex. 1 except that to 150 g of the lithium-containing composite oxide as a base material, 2.8 g of an ammonium zirconium carbonate $(NH_4)_2[Zr(CO_3)_2(OH)_2]$ aqueous solution having a Zr content of 2.5% was sprayed and then 1.2 g of a 15% ammonium dihydrogen phosphate aqueous solution was sprayed.

The obtained surface modified lithium-containing composite oxide was embedded in a resin and the cross section of the lithium-containing composite oxide was polished with cerium oxide fine particles, after that zirconium (Zr) and phosphorus (P) present on the particle of the cross section were mapped by EPMA, as a result zirconium element and phosphorus element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain $ZrO_2$ and $Li_3PO_4$. From results of measurement of EPMA and powder X-ray diffraction, it was confirmed that $ZrO_2$ and $Li_3PO_4$ were attached to the particle surface of the surface modified lithium-containing composite oxide.

Further, as calculated from the amounts of ammonium zirconium carbonate and ammonium dihydrogen phosphate sprayed to the lithium-containing composite oxide, the value calculated by dividing the number of moles $N_{Zr}$ of $ZrO_2$ attached to the particle surface by the total number of moles $N_{m+n}$ of M and N contained in the lithium-containing composite oxide as a base material i.e. $N_{Zr}/N_{m+n}$ was 0.0005, and the value calculated by dividing the number of moles $N_a$ of $Li_3PO_4$ attached to the particle surface by the total number of moles $N_{m+n}$ of M and N contained in the lithium-containing composite oxide as a base material i.e. $N_a/N_{m+n}$ was 0.001.

The press density of the obtained surface modified lithium-containing composite oxide powder was 3.6 g/cm³. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 180 mAh/g, the initial charge and discharge efficiency was 91.6%, and the capacity retention was 93.0%. Further, the thickness increase ratio of the laminate cell was 9%.

[Ex. 5] Example of the Present Invention

A powder of surface modified lithium-containing composite oxide was obtained in the same manner as in Ex. 1 except that to 150 g of the lithium-containing composite oxide as a base material, 5.6 g of an ammonium zirconium carbonate $(NH_4)_2[Zr(CO_3)_2(OH)_2]$ aqueous solution having a Zr content of 5% was sprayed and then 5.9 g of a 30% ammonium dihydrogen phosphate aqueous solution was sprayed.

The obtained surface modified lithium-containing composite oxide was embedded in a resin and the cross section of the lithium-containing composite oxide was polished with cerium oxide fine particles, after that zirconium (Zr) and phosphorus (P) present on the particle of the cross section were mapped by EPMA, as a result zirconium element and phosphorus element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain $ZrO_2$ and $Li_3PO_4$. From results of measurement of EPMA and powder X-ray diffraction, it was confirmed that $ZrO_2$ and $Li_3PO_4$ were attached to the particle surface of the surface modified lithium-containing composite oxide.

Further, as calculated from the amounts of ammonium zirconium carbonate and ammonium dihydrogen phosphate sprayed to the lithium-containing composite oxide, the value calculated by dividing the number of moles $N_{Zr}$ of $ZrO_2$ attached to the particle surface by the total number of moles $N_{m+n}$ of M and N contained in the lithium-containing composite oxide as a base material i.e. $N_{Zr}/N_{m+n}$ was 0.002, and the value calculated by dividing the number of moles $N_a$ of $Li_3PO_4$ attached to the particle surface by the total number of moles $N_{m+n}$ of M and N contained in the lithium-containing composite oxide as a base material i.e. $N_a/N_{m+n}$ was 0.01.

The press density of the obtained surface modified lithium-containing composite oxide powder was 3.5 g/cm³. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 176 mAh/g, the initial charge and discharge efficiency was 89.3%, and the capacity retention was 95.0%. Further, the thickness increase ratio of the laminate cell was 3%.

[Ex. 6] Example of the Present Invention

Surface modified lithium-containing composite oxide was obtained in the same manner as in Ex. 1 except that in the steps to obtain the large particle size lithium-containing composite oxide and the small particle size lithium-containing composite oxide, the firing temperature after calcination was 920° C.

The obtained surface modified lithium-containing composite oxide was embedded in a resin and the cross section of the lithium-containing composite oxide was polished with cerium oxide fine particles, after that zirconium (Zr) and phosphorus (P) present on the particle of the cross section were mapped by EPMA, as a result zirconium element and phosphorus element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain $ZrO_2$ and $Li_3PO_4$. From results of measurement of EPMA and powder X-ray diffraction, it was confirmed that $ZrO_2$ and $Li_3PO_4$ were attached to the particle surface of the surface modified lithium-containing composite oxide.

Further, as calculated from the amounts of ammonium zirconium carbonate and ammonium dihydrogen phosphate sprayed to the lithium-containing composite oxide, the value calculated by dividing the number of moles $N_{Zr}$ of $ZrO_2$ attached to the particle surface by the total number of moles $N_{m+n}$ of M and N contained in the lithium-containing composite oxide as a base material i.e. $N_{Zr}/N_{m+n}$ was 0.001, and the value calculated by dividing the number of moles $N_a$ of $Li_3PO_4$ attached to the particle surface by the total number of moles $N_{m+n}$ of M and N contained in the lithium-containing composite oxide as a base material i.e. $N_a/N_{m+n}$ was 0.005.

The press density of the obtained surface modified lithium-containing composite oxide powder was 3.6 g/cm$^3$. Further, in powder X-ray diffraction using CuKα radiation, the integral width of a diffraction peak of (110) plane at 2θ=66.5±1° was 0.13°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 179 mAh/g, the initial charge and discharge efficiency was 91.0%, and the capacity retention was 95.0%. Further, the thickness increase ratio of the laminate cell was 10%.

[Ex. 7] Example of the Present Invention

A surface modified lithium-containing composite oxide powder was obtained in the same manner as in Ex. 1 except that 5.6 g of an ammonium zirconium carbonate (NH$_4$)$_2$[Zr(CO$_3$)$_2$(OH)$_2$] aqueous solution having a Zr content of 2.5% was sprayed and then 5.9 g of a 15% ammonium dihydrogen phosphate aqueous solution was sprayed to 150 g of medium particle size lithium cobalt composite oxide having an average particle size of 15 μm, instead of the lithium-containing composite oxide obtained by mixing the large particle size lithium-containing composite oxide and the small particle size lithium-containing composite oxide.

The obtained surface modified lithium-containing composite oxide was embedded in a resin and the cross section of the lithium-containing composite oxide was polished with cerium oxide fine particles, after that zirconium (Zr) and phosphorus (P) present on the particle of the cross section were mapped by EPMA, as a result zirconium element and phosphorus element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain ZrO$_2$ and Li$_3$PO$_4$. From results of measurement of EPMA and powder X-ray diffraction, it was confirmed that ZrO$_2$ and Li$_3$PO$_4$ were attached to the particle surface of the surface modified lithium-containing composite oxide.

Further, as calculated from the amounts of ammonium zirconium carbonate and ammonium dihydrogen phosphate sprayed to the lithium-containing composite oxide, the value calculated by dividing the number of moles $N_{Zr}$ of ZrO$_2$ attached to the particle surface by the total number of moles $N_{m+n}$ of M and N contained in the lithium-containing composite oxide as a base material i.e. $N_{Zr}/N_{m+n}$ was 0.001, and the value calculated by dividing the number of moles $N_a$ of Li$_3$PO$_4$ attached to the particle surface by the total number of moles $N_{m+n}$ of M and N contained in the lithium-containing composite oxide as a base material i.e. $N_a/N_{m+n}$ was 0.005.

The press density of the obtained surface modified lithium-containing composite oxide powder was 3.4 g/cm$^3$. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 15.3 μm.

Then, in the same manner as in Ex. 1, the battery performance of the obtained surface modified lithium-containing composite oxide was evaluated and as a result, the initial discharge capacity was 175 mAh/g, the initial charge and discharge efficiency was 90.0%, and the capacity retention was 95.0%. Further, the thickness increase ratio of the laminate cell was 4%.

[Ex. 8] Comparative Example

A surface modified lithium-containing composite oxide powder was obtained in the same manner as in Ex. 1 except that to 150 g of the lithium-containing composite oxide, 5.6 g of an ammonium zirconium carbonate (NH$_4$)$_2$[Zr(CO$_3$)$_2$(OH)$_2$] aqueous solution having a Zr content of 2.5% was sprayed, followed by mixing, and the mixture was subjected to heat treatment.

The obtained surface modified lithium-containing composite oxide was embedded in a resin and the cross section of the lithium-containing composite oxide was polished with cerium oxide fine particles, after that zirconium (Zr) present on the particle of the cross section was mapped by EPMA, as a result zirconium element was detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain ZrO$_2$. From results of measurement of EPMA and powder X-ray diffraction, it was confirmed that ZrO$_2$ was attached to the particle surface of the surface modified lithium-containing composite oxide.

Further, as calculated from the amount of ammonium zirconium carbonate sprayed to the lithium-containing composite oxide, the value calculated by dividing the number of moles $N_{Zr}$ of ZrO$_2$ attached to the particle surface by the total number of moles $N_{m+n}$ of M and N contained in the lithium-containing composite oxide as a base material i.e. $N_{Zr}/N_{m+n}$ was 0.001.

The press density of the obtained surface modified lithium-containing composite oxide powder was 3.6 g/cm$^3$. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 177 mAh/g, the initial charge and discharge efficiency was 91.3%, and the capacity retention was 94.9%. Further, the thickness increase ratio of the laminate cell was 21%.

[Ex. 9] Comparative Example

A surface modified lithium-containing composite oxide powder was obtained in the same manner as in Ex. 1 except that to 150 g of the lithium-containing composite oxide, 4.15 g of an aluminum lactate aqueous solution having an Al content of 5% was sprayed and then 5.9 g of a 15% ammonium dihydrogen phosphate aqueous solution was sprayed, followed by mixing, and the mixture was subjected to heat treatment.

The obtained surface modified lithium-containing composite oxide was embedded in a resin and the cross section of the lithium-containing composite oxide was polished with cerium oxide fine particles, after that aluminum (Al) and phosphorus (P) present on the particle of the cross section were mapped by EPMA, as a result aluminum element and phosphorus element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain $AlPO_4$. From results of measurement of EPMA and powder X-ray diffraction, it was confirmed that $AlPO_4$ was attached to the particle surface of the surface modified lithium-containing composite oxide.

Further, as calculated from the amounts of aluminum lactate and ammonium dihydrogen phosphate sprayed to the lithium-containing composite oxide, the value calculated by dividing the number of moles of $AlPO_4$ attached to the particle surface by the total number of moles of M and N contained in the lithium-containing composite oxide as a base material was 0.005.

The press density of the obtained surface modified lithium-containing composite oxide powder was 3.6 g/cm$^3$. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 180 mAh/g, the initial charge and discharge efficiency was 91.0%, and the capacity retention was 89.0%. Further, the thickness increase ratio of the laminate cell was 13%.

[Ex. 10] Comparative Example

A surface modified lithium-containing composite oxide powder was obtained in the same manner as in Ex. 9 except that to 150 g of the lithium-containing composite oxide as a base material, 3.7 g of an aluminum lactate aqueous solution having an Al content of 20% was sprayed and then 5.3 g of a 30% ammonium dihydrogen phosphate aqueous solution was sprayed, followed by mixing, and the mixture was subjected to heat treatment.

The obtained surface modified lithium-containing composite oxide was embedded in a resin and the cross section of the lithium-containing composite oxide was polished with cerium oxide fine particles, after that aluminum (Al) and phosphorus (P) present on the particle of the cross section were mapped by EPMA, as a result aluminum element and phosphorus element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain $AlPO_4$. From results of measurement of EPMA and powder X-ray diffraction, it was confirmed that $AlPO_4$ was attached to the particle surface of the surface modified lithium-containing composite oxide.

Further, as calculated from the amounts of aluminum lactate and ammonium dihydrogen phosphate sprayed to the lithium-containing composite oxide, the value calculated by dividing the number of moles of $AlPO_4$ attached to the particle surface by the total number of moles of M and N contained in the lithium-containing composite oxide as a base material was 0.018.

The press density of the obtained surface modified lithium-containing composite oxide powder was 3.4 g/cm$^3$. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 171 mAh/g, the initial charge and discharge efficiency was 87.0%, and the capacity retention was 94.0%. Further, the thickness increase ratio of the laminate cell was 8%.

[Ex. 11] Comparative Example

A surface modified lithium-containing composite oxide powder was obtained in the same manner as in Ex. 1 except that to 150 g of the lithium-containing composite oxide, 4.2 g of an aqueous solution of manganese carbonate represented by the chemical formula $MnCO_3$ having a Mn content of 15% was sprayed and then 5.9 g of a 15% ammonium dihydrogen phosphate aqueous solution was sprayed, followed by mixing, and the mixture was subjected to heat treatment.

The obtained surface modified lithium-containing composite oxide was embedded in a resin and the cross section of the lithium-containing composite oxide was polished with cerium oxide fine particles, after that manganese (Mn) and phosphorus (P) present on the particle of the cross section were mapped by EPMA, as a result manganese element and phosphorus element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain $MnO_2$ and $Li_3PO_4$. From results of measurement of EPMA and powder X-ray diffraction, it was confirmed that $MnO_2$ and $Li_3PO_4$ were attached to the particle surface of the surface modified lithium-containing composite oxide.

Further, as calculated from the amounts of $MnCO_3$ and ammonium dihydrogen phosphate sprayed to the lithium-containing composite oxide, the value calculated by dividing the number of moles $N_{Mn}$ of $MnO_2$ attached to the particle surface by the total number of moles $N_{m+n}$ of M and N contained in the lithium-containing composite oxide as a base material i.e. $N_{Mn}/N_{m+n}$ was 0.0075, and the value calculated by dividing the number of moles $N_a$ of $Li_3PO_4$ attached to the particle surface by the total number of moles $N_{m+n}$ of M and N contained in the lithium-containing composite oxide as a base material i.e. $N_a/N_{m+n}$ was 0.005.

The press density of the obtained surface modified lithium-containing composite oxide powder was 3.6 g/cm$^3$. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 181 mAh/g, the initial charge and discharge efficiency was 91.7%, and the capacity retention was 89.5%. Further, the thickness increase ratio of the laminate cell was 17%.

[Ex. 12] Comparative Example

A surface modified lithium-containing composite oxide powder was obtained in the same manner as in Ex. 1 except that to 150 g of the lithium-containing composite oxide, 7.5 g of an aqueous solution of magnesium carbonate represented by the chemical formula $MgCO_3$ having a Mg content of 5% was sprayed and then 5.9 g of a 15% ammonium dihydrogen phosphate aqueous solution was sprayed, followed by mixing, and the mixture was subjected to heat treatment.

The obtained surface modified lithium-containing composite oxide was embedded in a resin and the cross section of the lithium-containing composite oxide was polished with cerium oxide fine particles, after that magnesium (Mg) and phosphorus (P) present on the particle of the cross section were mapped by EPMA, as a result magnesium element and phosphorus element were detected on the particle surface.

Further, with respect to the obtained surface modified lithium-containing composite oxide, a powder X-ray diffraction spectrum was measured in the same manner as in Ex. 1, and the obtained data were analyzed by Rietveld method. As a result, the surface modified lithium-containing composite oxide was confirmed to contain MgO and $Li_3PO_4$. From results of measurement of EPMA and powder X-ray diffraction, it was confirmed that MgO and $Li_3PO_4$ were attached to the particle surface of the surface modified lithium-containing composite oxide.

Further, as calculated from the amounts of magnesium carbonate represented as $MgO_3$ and ammonium dihydrogen phosphate sprayed to the lithium-containing composite oxide, the value calculated by dividing the number of moles $N_{Mg}$ of MgO attached to the particle surface by the total number of moles $N_{m+n}$ of M and N contained in the lithium-containing composite oxide as a base material i.e. $N_{Mg}/N_{m+n}$ was 0.01, and the value calculated by dividing the number of moles $N_a$ of $Li_3PO_4$ attached to the particle surface by the total number of moles $N_{m+n}$ of M and N contained in the lithium-containing composite oxide as a base material i.e. $N_a/N_{m+n}$ was 0.005.

The press density of the obtained surface modified lithium-containing composite oxide powder was 3.6 g/cm³. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 19.8 μm, and the shoulder peak was 6.9 μm.

Then, in the same manner as in Ex. 1, the battery performance of the obtained surface modified lithium-containing composite oxide was evaluated and as a result, the initial discharge capacity was 179 mAh/g, the initial charge and discharge efficiency was 91.1%, and the capacity retention was 89.0%. Further, the thickness increase ratio of the laminate cell was 14%.

[Ex. 13] Comparative Example

In the same manner as in Ex. 1, the large particle size lithium-containing composite oxide and the small particle size lithium-containing composite oxide were mixed to obtain a lithium-containing composite oxide. The press density of the obtained lithium-containing composite oxide power was 3.6 g/cm³. Further, in powder X-ray diffraction using CuKα radiation, the integral width of a diffraction peak of (110) plane at 2θ=66.5±1° was 0.11°. Further, in the particle size distribution of the lithium-containing composite oxide powder, the mode diameter was 19.8 μm and the shoulder peak was 6.9 μm.

Then, the battery performance of the obtained lithium-containing composite oxide was evaluated in the same manner as in Ex. 1 and as a result, the initial discharge capacity was 180 mAh/g, the initial charge and discharge efficiency was 92.8%, and the capacity retention was 56.4%. Further, the thickness increase ratio of the laminate cell was 29%.

[Ex. 14] Example of the Present Invention 1.93 g of magnesium carbonate, 20.89 g of aluminum maleate having an Al content of 2.65%, 1.29 g of basic ammonium zirconium carbonate having a Zr content of 14.5%, and 7.76 g of citric acid monohydrate were dissolved in 23.12 g of water to obtain an aqueous solution having a pH of 2.4. This aqueous solution and 197.32 g of cobalt oxyhydroxide having an average particle size of 15 μm, having a cobalt content of 60.0%, were mixed and dried in a constant temperature chamber at 80° C. to obtain a dry powder.

The obtained dry powder and 77.69 g of lithium carbonate having an average particle size of 5.6 μm, having a lithium content of 18.7%, were mixed in a mortar to obtain a raw material mixture. The obtained raw material mixture was calcined in the air at 400° C. for 10 hours and fired in the air at 1,000° C. for 14 hours and then crushed to obtain a powder of a medium particle size lithium-containing composite oxide having an average particle size of 15 μm. The composition of the obtained large particle size lithium-containing composite oxide was $Li_{1.01}(Co_{0.979}Mg_{0.01}Al_{0.01}Zr_{0.001})_{0.99}O_2$.

A surface modified lithium-containing composite oxide powder was obtained in the same manner as in Ex. 1 except that to 150 g of the obtained lithium-containing composite oxide, 7.5 g of an aqueous solution of magnesium carbonate represented by the chemical formula $MgCO_3$ having a Mg content of 5% was sprayed, and then 5.9 g of a 15% ammonium dihydrogen phosphate aqueous solution was sprayed, followed by mixing, and the mixture was subjected to heat treatment.

The obtained surface modified lithium-containing composite oxide was embedded in a resin and the cross section of the lithium-containing composite oxide was polished with cerium oxide fine particles, after that magnesium (Mg) and phosphorus (P) present on the particle of the cross section were mapped by EPMA, as a result magnesium element and phosphorus element were detected on the particle surface.

Further, with respect to the obtained surface modified lithium-containing composite oxide, a powder X-ray diffraction spectrum was measured in the same manner as in Ex. 1 and the obtained data were analyzed by Rietveld method. As a result, the surface modified lithium-containing composite oxide was confirmed to contain MgO and $Li_3PO_4$. From results of measurement of EPMA and powder X-ray diffraction, it was confirmed that MgO and Li$_3$PO$_4$ were attached to the particle surface of the surface modified lithium-containing composite oxide.

Further, as calculated from the amounts of magnesium carbonate represented by MgCO$_3$ and ammonium dihydrogen phosphate sprayed to the lithium-containing composite oxide, the value calculated by dividing the number of moles N$_{Mg}$ of MgO attached to the particle surface by the total number of moles N$_{m+n}$ of M and N contained in the lithium-containing composite oxide as a base material i.e. N$_{Mg}$/N$_{m+n}$ was 0.01, and the value calculated by dividing the number of moles N$_a$ of Li$_3$PO$_4$ attached to the particles surface to the total number of moles N$_{m+n}$ of M and N contained in the lithium-containing composite oxide as a base material i.e. N$_a$/N$_{m+n}$ was 0.005.

The press density of the obtained surface modified lithium-containing composite oxide powder was 3.4 g/cm$^3$. Further, in powder X-ray diffraction using CuKα radiation, the integral width of a diffraction peak of (110) plane at 2θ=66.5±1° was 0.11°. Further, in the particle size distribution of the surface modified lithium-containing composite oxide powder, the mode diameter was 15.3 µm.

Then, in the same manner as in Ex. 1, the battery performance of the obtained surface modified lithium-containing composite oxide was evaluated and as a result, the initial discharge capacity was 175 mAh/g, the initial charge and discharge efficiency was 90.0%, and the capacity retention was 87.0%. Further, the thickness increase ratio of the laminate cell was 15%.

Comparison Between Examples of the Present Invention and Comparative Examples

In the above Examples of the present invention and Comparative Examples, a surface modified lithium-containing composite oxide in which only zirconium oxide was attached to the particle surface, has low swelling-suppressing performance. Further, a surface modified lithium-containing composite oxide in which aluminum phosphate, phosphoric acid and magnesium oxide, or phosphoric acid and manganese dioxide, are attached to the particle surface, has low battery performance such as the charge and discharge cycle durability. Whereas the surface modified lithium-containing composite oxide of the present invention in which zirconium oxide and a specific lithium salt are attached to the particle surface, has high swelling-suppressing performance and high battery performance such as the charge and discharge cycle durability. Further, it has high swelling-suppressing performance as compared with a case where only zirconium oxide is attached to the particle surface, and has high battery performance such as the charge and discharge cycle durability as compared with a case where aluminum phosphate, phosphoric acid and magnesium oxide, or phosphoric acid and manganese dioxide, are attached to the particle surface.

INDUSTRIAL APPLICABILITY

According to the present invention, a cathode active material for a non-aqueous electrolyte secondary battery, which is excellent in the battery performance such as the charge and discharge cycle durability when used under high voltage, and which is excellent in the swelling-suppressing performance when stored at high temperature in a state where it is charged under high voltage, is provided.

This application is a continuation of PCT Application No. PCT/JP2013/084971, filed on Dec. 26, 2013, which is based upon and claims the benefit of priority from Japanese Patent Application No. 2012-287780 filed on Dec. 28, 2012. The contents of those applications are incorporated herein by reference in their entireties.

What is claimed is:

1. Surface modified lithium-containing composite oxide particles comprising:
   base material particles of lithium-containing composite oxide which is represented by the formula: Li$_p$N$_x$M$_y$O$_z$F$_a$, wherein N is at least one element selected from the group consisting of Co, Mn and Ni, M is at least one element selected from the group consisting of Al, elements of group 2, and transition metal elements other than N, 0.9≤p<1.1, 0.85≤x≤1.0, 0≤y≤0.15, 1.9≤z≤2.1, x+y=1, and 0≤a≤0.05;
   zirconium hydroxide or zirconium oxide; and
   at least one lithium salt selected from the group consisting of Li$_2$ZrF$_6$, Li$_2$TiF$_6$, Li$_3$PO$_4$, Li$_2$SO$_4$ and Li$_2$SO$_4$.H$_2$O, the zirconium hydroxide or zirconium oxide and the at least one lithium salt being attached to a surface of the base material particle,
   wherein the value calculated by dividing the number of moles N$_{Zr}$ of the zirconium hydroxide and zirconium oxide attached to the surface of the base material particle by the total number of moles N$_{m+n}$ of M and N contained in the lithium-containing composite oxide (N$_{Zr}$/N$_{m+n}$) is 0.0004<N$_{Zr}$/N$_{m+n}$<0.003, and
   wherein the value calculated by dividing the number of moles N$_a$ of the at least one lithium salt attached to the surface of the base material particle by the total number of moles N$_{m+n}$ of M and N contained in the lithium-containing composite oxide (N$_a$/N$_{m+n}$) is 0.001<N$_a$/N$_{m+n}$<0.01.

2. The surface modified lithium-containing composite oxide particles according to claim 1, wherein the value calculated by dividing N$_{Zr}$ by N$_a$(N$_{Zr}$/N$_a$) is 0.05≤N$_{Zr}$/N$_a$≤2.0.

3. The surface modified lithium-containing composite oxide particles according to claim 1, wherein the lithium salt is Li$_2$ZrF$_6$ or Li$_3$PO$_4$.

4. The surface modified lithium-containing composite oxide particles according to claim 1, wherein zirconium oxide is attached to the surface of the base material particle.

5. The surface modified lithium-containing composite oxide particles according to claim 1, wherein N is Co.

6. The surface modified lithium-containing composite oxide particles according to claim 1, wherein M is at least one element selected from the group consisting of Al, Zr and Mg.

7. The surface modified lithium-containing composite oxide particles according to claim 1, wherein in a powder X-ray diffraction spectrum using CuKα radiation, the integral width of a diffraction peak of (110) plane at 2θ=66.5±1° of the surface modified lithium-containing composite oxide particles is from 0.08 to 0.20°.

8. The surface modified lithium-containing composite oxide particles according to claim 1, wherein the mode diameter of the particle size distribution of the surface modified lithium-containing composite oxide particles is from 15 to 25 µm, and the shoulder peak of the surface modified lithium-containing composite oxide particles is from 4 to 10 µm.

9. A positive electrode for a non-aqueous electrolyte secondary battery, comprising:
   a cathode active material comprising the surface modified lithium-containing composite oxide particles as defined in claim 1;

a conductive materials; and
a binder.

10. A non-aqueous electrolyte secondary battery, comprising:
    a positive electrode as defined in claim 9;
    a negative electrode;
    a non-aqueous electrolyte; and
    an electrolytic solution.

11. The surface modified lithium-containing composite oxide particles according to claim 3, wherein zirconium oxide is attached to the surface of the base material particle.

12. The surface modified lithium-containing composite oxide particles according to claim 11, wherein N is Co.

13. The surface modified lithium-containing composite oxide particles according to claim 12, wherein M is at least one element selected from the group consisting of Al, Zr and Mg.

14. The surface modified lithium-containing composite oxide particles according to claim 13, wherein the value calculated by dividing the number of moles $N_{Zr}$ of the zirconium oxide attached to the surface of the base material particle by the total number of moles $N_{m+n}$ of M and N contained in the lithium-containing composite oxide ($N_{Zr}/N_{m+n}$) is $0.0005 < N_{Zr}/N_{m+n} < 0.002$.

15. The surface modified lithium-containing composite oxide particles according to claim 14, wherein the value calculated by dividing the number of moles $N_a$ of the at least one lithium salt attached to the surface of the base material particle by the total number of moles $N_{m+n}$ of M and N contained in the lithium-containing composite oxide ($N_a/N_{m+n}$) is $0.001 < N_a/N_{m+n} < 0.005$.

* * * * *